US009226164B2

United States Patent
Oonaru (10) Patent No.: US 9,226,164 B2
(45) Date of Patent: Dec. 29, 2015

(54) MOBILE COMMUNICATION TERMINAL AND SEARCH METHOD

(75) Inventor: Shinichi Oonaru, Osaka (JP)

(73) Assignee: KYOCERA Corporation, Kyoto (JP)

( * ) Notice: Subject to any disclaimer, the term of this patent is extended or adjusted under 35 U.S.C. 154(b) by 123 days.

(21) Appl. No.: 14/111,996

(22) PCT Filed: Apr. 12, 2012

(86) PCT No.: PCT/JP2012/059966
§ 371 (c)(1),
(2), (4) Date: Oct. 15, 2013

(87) PCT Pub. No.: WO2012/141234
PCT Pub. Date: Oct. 18, 2012

(65) Prior Publication Data
US 2014/0029510 A1     Jan. 30, 2014

(30) Foreign Application Priority Data
Apr. 15, 2011    (JP) .................................. 2011-090719

(51) Int. Cl.
| | |
|---|---|
| H04W 16/26 | (2009.01) |
| H04W 52/02 | (2009.01) |
| H04M 1/725 | (2006.01) |
| H04W 48/16 | (2009.01) |
| H04W 84/04 | (2009.01) |

(52) U.S. Cl.
CPC ............ *H04W 16/26* (2013.01); *H04M 1/7253* (2013.01); *H04M 1/72572* (2013.01); *H04M 2250/06* (2013.01); *H04M 2250/10* (2013.01); *H04W 48/16* (2013.01); *H04W 52/028* (2013.01); *H04W 52/0229* (2013.01); *H04W 84/047* (2013.01)

(58) Field of Classification Search
None
See application file for complete search history.

(56) References Cited

U.S. PATENT DOCUMENTS

| | | | | |
|---|---|---|---|---|
| 7,760,814 | B2* | 7/2010 | Jungnickel et al. | 375/267 |
| 8,378,886 | B2* | 2/2013 | Farrokhi | G01S 19/22 342/357.25 |
| 2001/0039192 | A1* | 11/2001 | Osterling et al. | 455/502 |
| 2001/0053699 | A1* | 12/2001 | McCrady | G01S 5/021 455/513 |
| 2003/0058833 | A1* | 3/2003 | Hashem et al. | 370/350 |
| 2004/0012524 | A1* | 1/2004 | Couronne et al. | 342/387 |

(Continued)

FOREIGN PATENT DOCUMENTS

| | | |
|---|---|---|
| JP | 2001-103002 A | 4/2001 |
| JP | 2001-272450 A | 10/2001 |
| JP | 2009-094827 A | 4/2009 |

OTHER PUBLICATIONS

International Search Report dated May 15, 2012, issued for International Application No. PCT/JP2012/059966.

*Primary Examiner* — Jenee Williams
(74) *Attorney, Agent, or Firm* — Procopio, Cory, Hargreaves & Savitch LLP (57) ABSTRACT

A mobile communication terminal and method includes a short-distance radio communication module to perform a short-distance communication by a first radio wave via a radio repeater; a reception module receives a second radio wave different from the first radio wave; a determination module determines whether the mobile communication terminal exists indoors or outdoors based on a state of the second radio wave that is received by the reception module; and a search module searches a radio repeater if and when the determination module determines that the mobile communication terminal exists indoors.

6 Claims, 5 Drawing Sheets

(56) References Cited

U.S. PATENT DOCUMENTS

| | | |
|---|---|---|
| 2005/0136845 A1* | 6/2005 | Masuoka et al. ............ 455/67.14 |
| 2006/0068728 A1* | 3/2006 | Ishidoshiro et al. ....... 455/150.1 |
| 2006/0286937 A1* | 12/2006 | Russell et al. ............. 455/67.11 |
| 2007/0072621 A1* | 3/2007 | Mukkavilli et al. ........ 455/456.1 |
| 2008/0238772 A1* | 10/2008 | Soloviev et al. ......... 342/357.14 |
| 2009/0303067 A1* | 12/2009 | Sharp ........................ 340/686.1 |
| 2010/0265888 A1* | 10/2010 | Kim et al. ..................... 370/328 |
| 2010/0311415 A1* | 12/2010 | Hamabe et al. ............... 455/425 |
| 2010/0315287 A1* | 12/2010 | Karpitski ................. 342/357.28 |
| 2011/0018732 A1* | 1/2011 | Cho et al. ................. 340/825.49 |
| 2011/0103360 A1* | 5/2011 | Ku et al. ....................... 370/338 |
| 2011/0211511 A1* | 9/2011 | Bakthavathsalu et al. .... 370/311 |
| 2012/0163344 A1* | 6/2012 | Bakthavathsalu et al. .... 370/332 |
| 2012/0249798 A1* | 10/2012 | Kim ............................... 348/159 |
| 2012/0252425 A1* | 10/2012 | Moeglein ............... H04W 84/18 455/418 |
| 2012/0263059 A1* | 10/2012 | Kim et al. ...................... 370/252 |
| 2012/0280859 A1* | 11/2012 | Moshfeghi ............... G01S 19/07 342/357.44 |
| 2013/0157638 A1* | 6/2013 | Malmbak et al. ............. 455/418 |

* cited by examiner

MOBILE COMMUNICATION TERMINAL AND SEARCH METHOD

FIELD OF ART

The present invention relates to a mobile communication terminal and a search method, and more specifically, a mobile communication terminal which is provided with a radio communication function such as a mobile phone and a near field radio communication function of a Wi-Fi system, for example, and a search method.

BACKGROUND ART

In a case where a near field communication function such as a Wi-Fi (trademark) is utilized in such a kind of mobile communication terminal, usually, the mobile communication terminal accesses a wired LAN through a radio repeater called as an access point (AP). Such a radio repeater is provided only indoors and a limited place. Therefore, it is necessary for a user who intends to perform a near field communication to search a radio repeater. Although there is recently an internet service that provides information where radio repeaters are, a work for searching a radio repeater is still troublesome.

On the other hand, in a mobile communication terminal having a short-distance radio communication function, since a function that automatically searches a radio repeater and then connects to the same is provided in a short-distance radio communication circuit, a user who intends to utilize the short-distance radio communication always makes the short-distance radio communication circuit in an ON state. If so, since the short-distance radio communication circuit automatically searches a radio repeater (access point), it is unnecessary for a user himself/herself to manually search a radio repeater. However, because it is necessary to keep the short-distance radio communication circuit turning-on outdoors, consumption of a battery is large.

In order to search a radio repeater by using a short-distance radio communication circuit and to minimize consumption of a battery, the short-distance radio communication circuit may be turned-off if and when the mobile communication terminal goes outside and the short-distance radio communication circuit may be turned-on if and when the mobile communication terminal comes inside, but such an on/off operation is troublesome.

In the patent literature 1, a method that estimates whether existing outdoors or indoors by using a camera is disclosed. It can be conceived that the short-distance radio communication circuit is automatically turned-on/off by automatically determining whether existing outdoors or indoors by utilizing such a background art. Then, since a radio repeater can be automatically searched by turning-on the short-distance radio communication circuit as necessary, wasteful consumption of a battery can be suppressed and the user can be released from a troublesome manual operation for turning-on/off.

Patent literature 1: Japanese Patent Application Laying-Open No. 2001-103002 [H04B 7/26 H01Q 3/24]

SUMMARY OF THE INVENTION

Problems to be Solved by the Invention

In the background art in the patent literature 1, a camera does not operate usually in a state that a mobile communication terminal is put into a pocket or bag, for example, and accordingly, when the mobile communication terminal is being in such a state, it is impossible to adequately estimate whether existing outdoors or indoors, and therefore, an automatic on/off switching of the short-distance radio communication circuit, that is conceived above, is not necessarily performed surely and adequately.

Therefore, a primary object of the present invention is to provide a novel mobile communication terminal and a search method therefor.

Another object of the present invention is to provide a mobile communication terminal and a search method, capable of surely and adequately searching a radio repeater without a user's operation.

The other object of the present invention is to provide a mobile communication terminal and a search method, capable of searching a radio repeater without a user operation and wasteful consumption of a battery.

Means for Solving the Problems

The present invention employs following features in order to solve the above-described problems. It should be noted that reference numerals and the supplements inside the parentheses show one example of a corresponding relationship with the embodiments described later for easy understanding of the present invention, and do not limit the present invention.

A first aspect according to the present invention is a mobile communication terminal and method including a short-distance radio communication module that performs a short-distance communication by a first radio wave via a radio repeater; a reception module that receives a second radio wave different from the first radio wave; a determination module that determines whether the mobile communication terminal exists indoors or outdoors based on a state of the second radio wave that is received by the reception module; and a search module that searches a radio repeater if and when the determination module determines that the mobile communication terminal exists indoors.

Advantages of the Invention

According to the present invention, it is possible to surely and adequately search a radio repeater without user's troublesome operation. Furthermore, in a case where the second radio wave a radio wave that is always received by the mobile communication terminal, it is not necessary to utilize a special reception module for determining whether the mobile communication terminal exists indoors or outdoors, and therefore, it is possible to suppress consumption of a battery.

The above described objects and other objects, features, aspects and advantages of the present invention will become more apparent from the following detailed description of the present invention when taken in conjunction with the accompanying drawings.

FORMS FOR EMBODYING THE INVENTION

Figure 1:
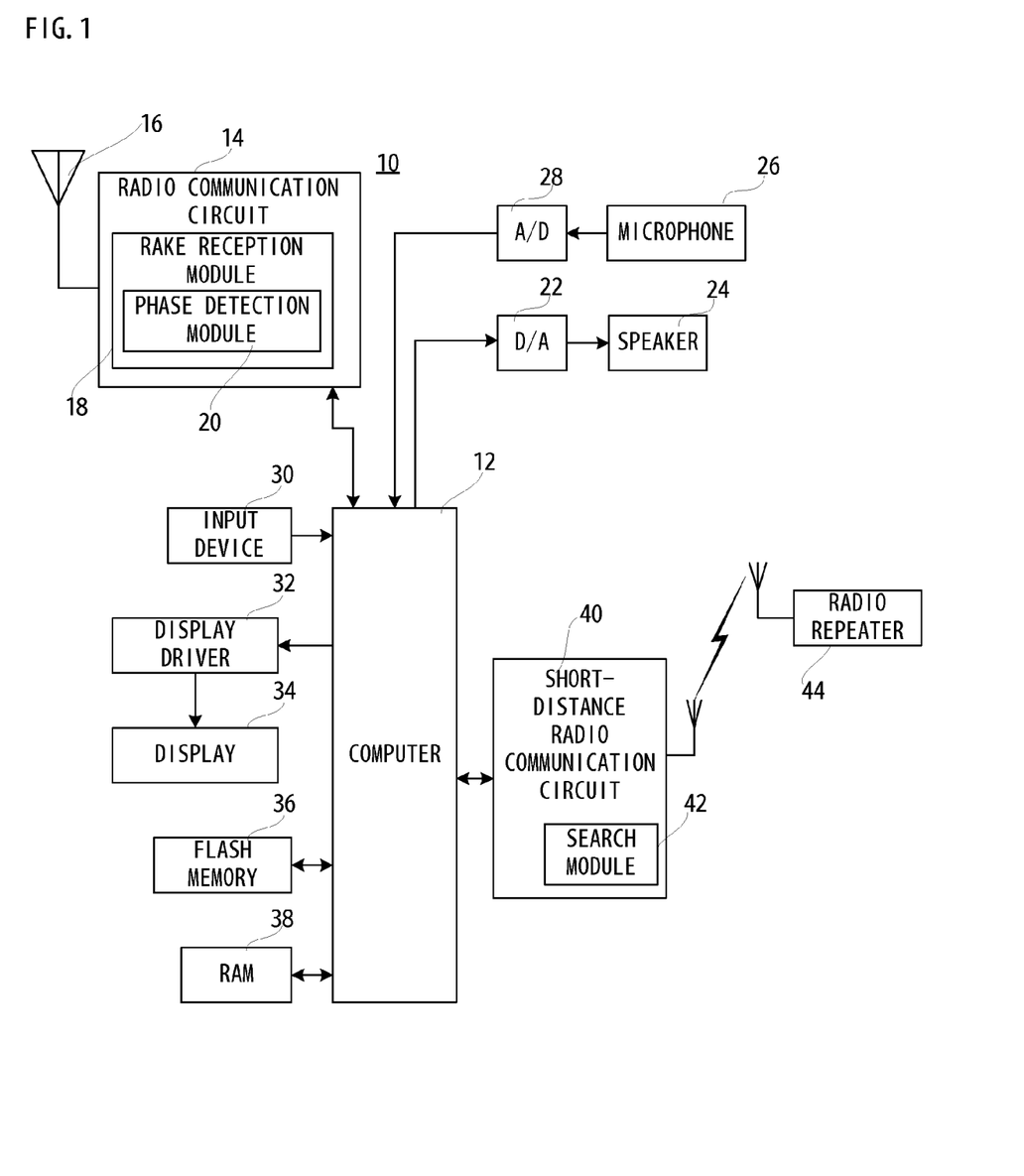
FIG. 1 is an illustrative view showing electrical structure of a mobile communication terminal that is an embodiment according to the present invention.

With referring to FIG. 1, a mobile communication terminal 10 according to this embodiment is a mobile phone of a CDMA (Code Division Multiple Access) system as one example, and includes a computer 12 called as a processor, a CPU or the like. The computer 12 causes a radio communication circuit or module 14 and an antenna 16 to receive or send a radio wave for mobile phone (a second radio wave). Since the mobile communication terminal 10 is a mobile phone of a CDMA system in this embodiment, the radio communication circuit 14 includes a rake reception module 18, and the rake reception module 18 includes a phase detection module 20.

In addition, it is pointed out in advance that a block diagram of FIG. 1 mainly illustrates modules or portions necessary for describing this embodiment, and illustration in Figure is omitted for modules or portions generally included in a mobile communication terminal but not important for describing the embodiment.

A multipath means a phenomenon that a radio wave that is sent traces a plurality of courses before the radio wave is received, and occurs due to generation of a reflected wave, a transmitted wave, a diffracted wave, etc. other than a direct wave. The reflected wave advances while being reflected by obstacles such as tool buildings and so on, and thus, the reflected wave is received late a little than the direct wave. A radio wave that is not reflected by the obstacles and passes through the obstacles is called as the transmitted wave. A radio wave that passes a corner of the obstacles is changed in direction by an inflection is the diffracted wave. Such a multipath is a radio wave that becomes an obstruction for the direct wave.

In contrast, for the mobile phone of the CDMA system in the embodiment, a technique called as "rake reception" that positively utilizes the multipath is adopted.

A rake is "Kumade (Japanese rake)", and the rake reception means "radio waves are received while being raked". More specifically, in a case where a direct wave and a reflected wave reach from a plurality of directions as a multipath, these have an unfavorable influence upon a primary reception as interference waves each having the same frequency. Then, a technique that the radio waves of the multipath are individually received, and then, the radio waves are utilized by superposing the radio waves on each other after phase deviations thereof are corrected is the rake reception. A signal superposed by the rake reception becomes larger than a signal that only the direct wave is fetched, and thus, becomes more tolerant to a noise due to a rise in an S/N ratio.

A portion or module that implements such a rake reception is a rake reception module 18, and since it is necessary to correct a phase deviation as described above in the rake reception module 18, the rake reception module 18 includes a phase detection module 20. The phase detection module 20 detects a degree of a phase deviation of each of respective signals (phase differences) by individually comparing the phase of the signal by each of the respective radio waves of the multipath with a phase of a reference signal (a pilot signal), for example, to obtain data indicating the phase difference of each of the respective signals. The phase difference data is utilized for a phase correction in the rake reception module 18.

In addition, in a case where the mobile communication terminal 10 is a mobile phone, in the radio communication circuit 14, the above-described rake reception module 18 outputs a reception signal by processing a radio wave for mobile phone that is received from the antenna 16. The radio communication circuit 14 reproduces or demodulates a voice signal from the reception signal, and the voice signal is input to the computer 12. The voice signal is converted into voice data by the computer 12 to be output, and further converted into an output voice signal by a D/A converter 22, and then, output as a voice from a speaker 24.

On the other hand, a voice signal from a microphone 26 is converted into voice data by an A/D converter 28 to be input to the computer 12, and then, output to the radio communication circuit 14 from the computer 12. The radio communication circuit 14 produces a transmission signal including the voice data to send the transmission signal from the antenna 16. The transmission signal is received as a mobile phone signal by a mobile phone of the other person on the phone via a base station (not shown).

In addition, in a case where the mobile communication terminal 10 is a mobile communication terminal such as a PDA or a tablet computer other than a mobile phone, the radio communication circuit 14 can be utilized for sending/receiving an email, for example. That is, the mobile communication terminal 10 to which the present invention can be applied is not limited to a mobile phone and thus may be an arbitrary communication terminal.

In addition, the phase difference data of each multipath signal detected by the phase detection module 20 is also applied to the computer 12.

A key input device 30 functions as an operation module, and includes a call key, an end key, a ten-key, etc. Furthermore, information of a key that a user operates (key data) is input to the computer 12.

A display driver 32 controls displaying of a display 34 which is connected to the display driver 32 under instructions by the computer 12. Furthermore, the display driver 32 includes a video memory (not shown) that temporarily stores image data to be displayed.

A flash memory 36 stores in advance a program (described later), for example, or is utilized as an external memory, and a RAM 38 is utilized for a temporal storage.

A short-distance radio communication circuit or module 40 of the mobile communication terminal 10 performs a short-distance radio communication in a Wi-Fi system. Wi-Fi (Wireless Fidelity) is a name indicating that an interconnectivity between radio equipment each utilizing a communication standard of IEEE 802, 11 series (IEEE 802, 11a/IEEE 802, 11b) and so on are certified by a designated certification agency. That is, Wi-Fi is one system for a short-distance radio communication, and the mobile communication terminal 10 of this embodiment utilizes the short-distance radio communication circuit 40 of the Wi-Fi system.

In the short-distance radio communication of Wi-Fi system, a mobile communication terminal accesses a wired LAN via a radio repeater 44 that is called as an access point, and therefore, there is provided in the short-distance radio communication circuit 40 with a search module 42 that automatically searches such a radio repeater 44. Then, if and when the search module 42 finds a radio repeater 44, the short-distance radio communication circuit 40 automatically performs a connection process with the radio repeater 44.

Figure 2:
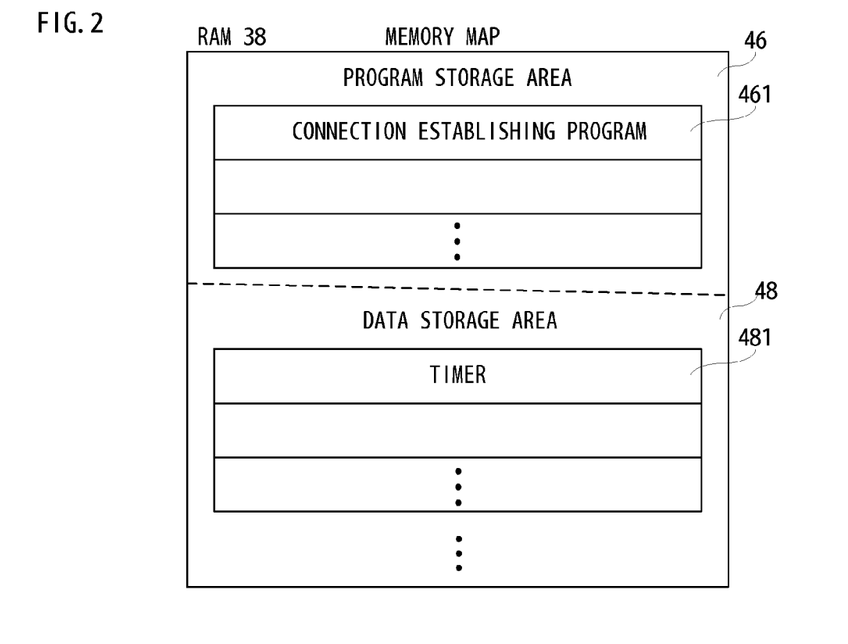
FIG. 2 is an illustrative view showing one example of a memory map of a RAM shown in FIG. 1.

FIG. 2 is a view showing a memory map of the RAM 38. A program storage area 46 and a data storage area 48 are formed in the RAM 38. In the program storage area 46, other than an OS and a basic program (not shown) for operating the mobile communication terminal 10, a connection establishing program 461 for this embodiment is stored. The connection establishing program 461 is a program that a radio repeater 44 to which the short-distance radio communication circuit 40 shown in FIG. 3 described later is to be connected (although it is a radio communication, a term "connect" is used for convenience) is searched by the search module 42, and connects the short-distance radio communication circuit 40 with a radio repeater 44 that is successfully searched. Furthermore, the data storage area 48 functions as a working memory for performing the above-described programs, but in this embodiment, a timer area 481 is further set therein.

In addition, the program and the data are wholly read at once or partly and sequentially read as necessary, and processed by the computer 12 after stored in the RAM 38.

Figure 3:
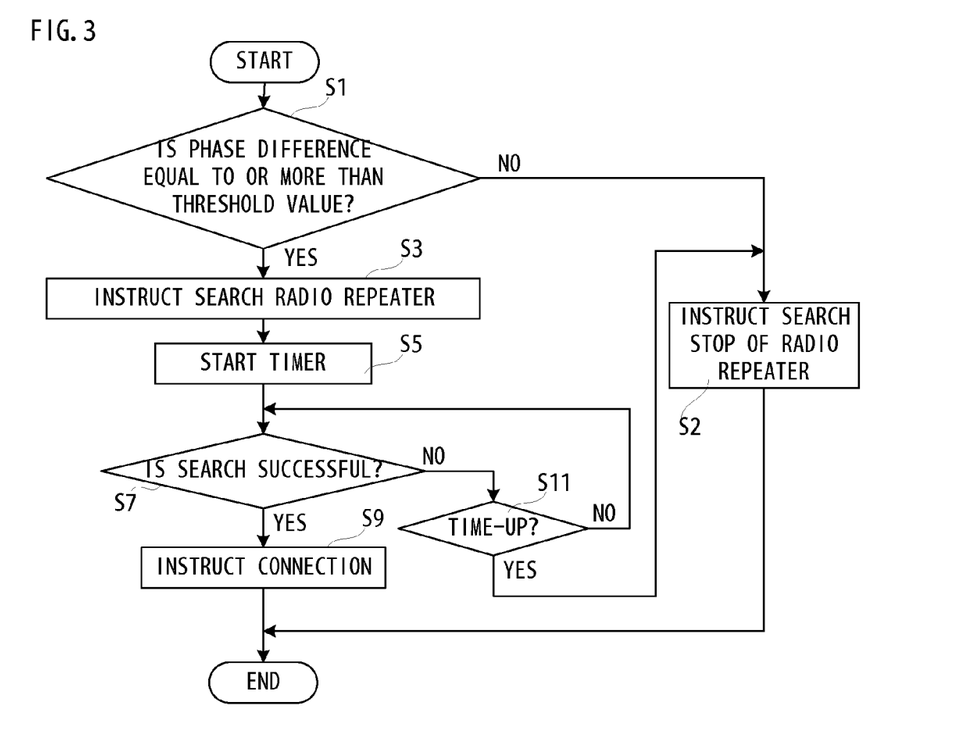
FIG. 3 is a flowchart showing one example of an operation of FIG. 1 embodiment.

FIG. 3 is a flowchart showing an operation of FIG. 1 embodiment, and this processing routine is started and executed at every time that the computer 12 receives the phase difference data from the phase detection module 20, as mentioned above.

In and when the computer 12 receives the phase difference data from the phase detection module 20, in a first step S1, the computer 12 determines whether phase difference data equal to or more than a predetermined threshold value is included in the phase difference data that is received at that time. A fact that "NO" is determined in the step S1 means that there is no radio wave that is received late more than the threshold value with respect to the reference signal, that is, there occurs no multipath equal to or more than a predetermined degree. A fact that no multipath equal to or more than the predetermined degree occurs means that the mobile communication terminal 10 is highly likely to exist outdoors. Therefore, it is meaningless to search a radio repeater 44 such as an access point, and therefore, in a next step S2, the computer 12 applies to the search module 42 included in the short-distance radio communication circuit 40 a search stop instruction instructing a stop of search. Therefore, it is possible to avoid futility that the search module 42 searches a radio repeater outdoors. Accordingly wasteful consumption of a battery attending a useless search is prevented, and thus, it is possible to suppress consumption of a battery eventually.

After the search by the search module 42 is stopped in the step S2, the process of FIG. 3 is ended.

In addition, in a case where a user performs an operation for turning-on the short-distance radio communication circuit 40, the step S2 may not be executed, and the process of FIG. 3 may be ended with no operation if and when "NO" is determined in the step S1. However, even if the user turns-on the short-distance radio communication circuit 40, the step S2 may be executed. In such a case, even if the short-distance radio communication circuit 40 is being carelessly turned-on by the user, it is possible to surely stop wasteful consumption of a battery.

If and when "YES" is determined in the step S1, that is, if and when it is determined that a multipath equal to or more than the predetermined degree occurs, the process by the computer 12 proceeds to a next step S3. A fact that a multipath equal to or more than a predetermined degree occurs means that the mobile communication terminal 10 is highly likely to exist indoors. Therefore, the computer 12 applies, in the step S3, a search instruction instructing a search to the search module 42 of the short-distance radio communication circuit 40 in order to search a radio repeater (access point) 44, and the computer 12 starts the timer 481 (FIG. 2) in a step S5, thereby to count a time from issuance of the search instruction.

If and when the search instruction is issued from the computer 12, the search module 42 searches a radio repeater 44 that is available for the mobile communication terminal 10 by gradually changing a frequency used by the short-distance radio communication circuit 40, for example.

If and when the search module 42 searches the radio repeater 44, a notice of search success is applied to the computer 12. Then, in a step S7, the computer 12 determines whether the notice of search success is input from the search module 42.

If and when "YES" is determined in the step S7, the computer 12 applies to the short-distance radio communication circuit 40 a connection instruction that a connection operation to the radio repeater 44 that is searched should be performed. Accordingly, the short-distance radio communication circuit 40 accesses the radio repeater 44 by using a radio wave at a frequency (a first radio wave) that the searches a radio repeater 44.

In addition, a search of a radio repeater and a connecting operation after the search are not changed from those in a method generally performed in a mobile communication terminal that is currently put into practical use, and therefore, a detailed description thereof is omitted here.

If and when "NO" is determined in the previous step S7, in a step S11, the computer 12 determines whether the timer 481 that is started in the step S5 is time-up. The timer 481 is set such that fifteen (15) seconds (but, not limited to this numeral value) can be counted, for example. Therefore, if and when the search module 42 cannot search the radio repeater 44 after 15 seconds, "NO" is determined in the step S11, and in such a case, the process proceeds to the above-described step S2. Accordingly, if and when a radio repeater 44 cannot be searched before 15 seconds elapse, in order to suppress wasteful consumption of a battery, the computer 12 outputs a search stop instruction to the search module 42 in the step S2.

Thus, in FIG. 1 embodiment, if and when it is estimated that the mobile communication terminal 10 exists indoors, a radio repeater 44 such as an access point can be automatically searched by the search module 42 of the short-distance radio communication circuit 40, and therefore, there is no troublesomeness that the user manually instructs a search. Furthermore, in comparison with a case where it is determined whether the mobile communication terminal 10 exists indoors or outdoors in accordance with a camera image, for example, even if the mobile communication terminal 10 is put into a bag or a pocket, a determination can be surely performed. If and when a state of the second radio wave that is usually received by the mobile communication terminal 10, e.g., a state that a multipath equal to or more than a predetermined degree occurs is detected in order to determine whether the mobile communication terminal 10 exists outdoors or indoors, since it is not necessary to use a separate radio reception module for a determination whether the mobile communication terminal 10 exists indoors or outdoors, there is no consumption of an extra electric power more than an electric power in a usual waiting state of the mobile communication terminal 10. Therefore, the consumption of a battery can be suppressed.

Figure 4:
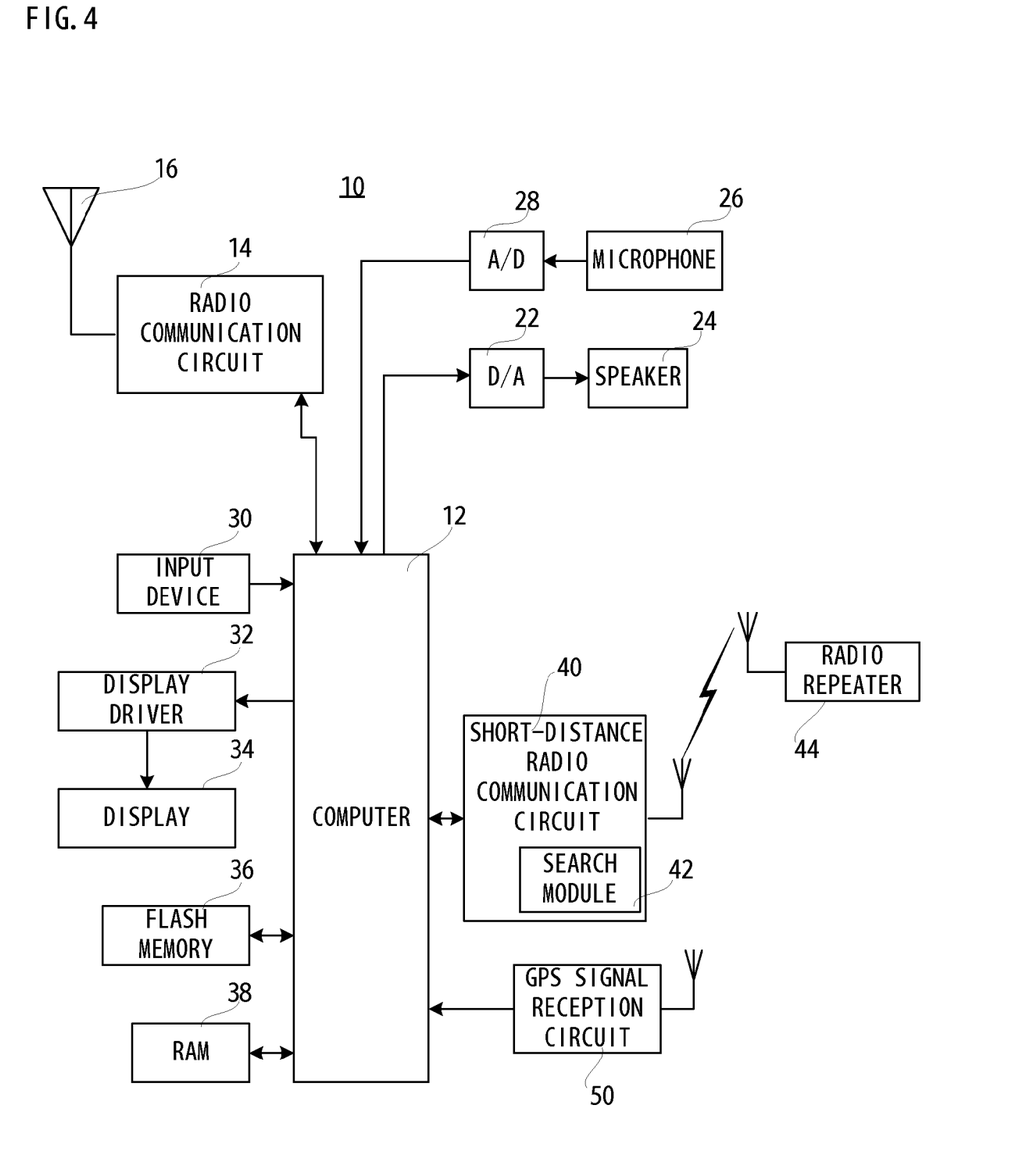
FIG. 4 is an illustrative view showing electrical structure of a mobile communication terminal that is another embodiment according to the present invention.
Figure 5:
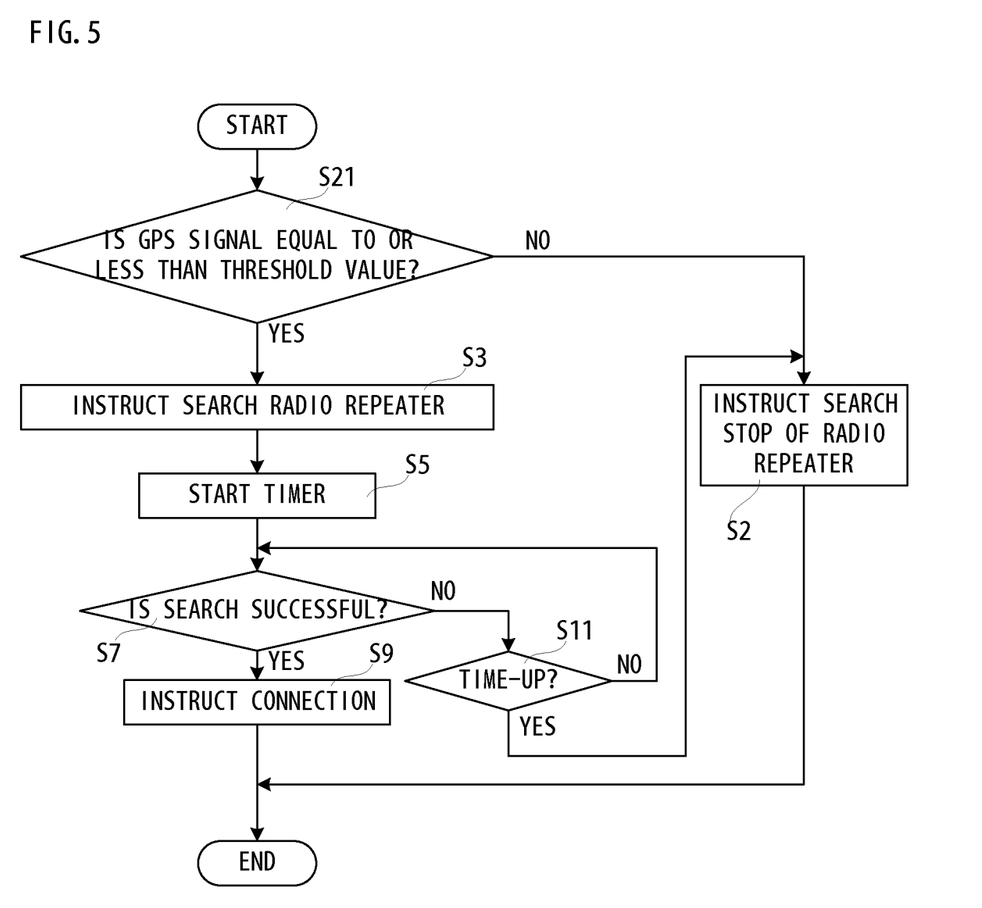
FIG. 5 is a flowchart showing one example of an operation of FIG. 4 embodiment.

However, in a further embodiment shown in FIG. 4 and FIG. 5, as a second radio wave, a radio wave different from a radio wave usually received by the mobile communication terminal 10 is utilized. Accordingly, in the embodiment shown in FIG. 4, a GPS signal reception circuit or module 50 is provided in the mobile communication terminal 10. The GPS signal reception circuit 50 is the same or similar to a circuit that is conventionally provided in a mobile communication terminal.

In FIG. 4 embodiment, as shown in a step S21 in FIG. 5, the computer 12 determines whether a reception strength of a GPS signal in the GPS signal reception circuit 50 is equal to or less than a predetermined threshold value. That is, the computer 12 estimates that the mobile communication terminal 10 exists indoors if and when the signal strength of the GPS signal is equal to or less than the threshold value. As well known, the GPS signal is utilized for detecting an outdoor position of a mobile communication terminal on a map, and therefore, the GPS signal cannot be usually received indoors. Then, in this embodiment, it is determined whether the mobile communication terminal 10 exists outdoors or indoors by determining whether the reception strength of the GPS signal becomes equal to or less than the threshold value.

Since FIG. 5 showing an operation of FIG. 4 embodiment is similar to the operation of the first embodiment described in FIG. 3 except the above-described operation is performed in a step S21, a duplicate description is omitted here.

In addition, the embodiment of FIG. 4 is available irrespective whether the radio communication circuit 14 is of the CDMA system.

Figure 6:
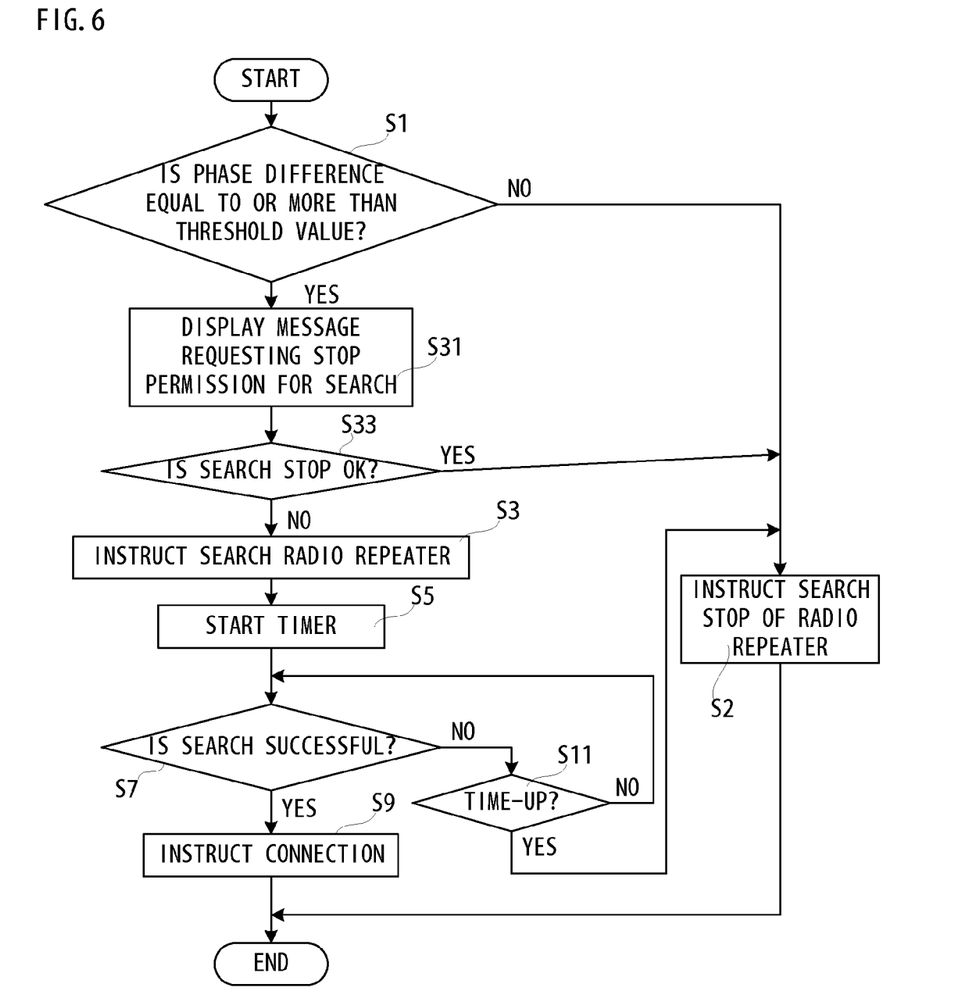
FIG. 6 is a flowchart showing one example of an operation of a modified example of FIG. 3 embodiment.
Figure 7:
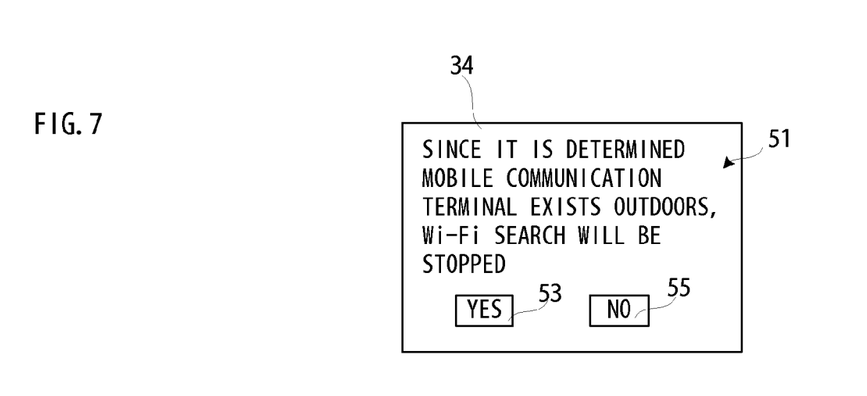
FIG. 7 is an illustrative view showing one example of a message requesting a user of permission to stop a search of a radio repeater in FIG. 6 embodiment.

Furthermore, between the step S1 and the step S3 of the embodiment of FIG. 3, by providing a step S31 as shown in FIG. 6, an inquiry message 51 as shown in FIG. 7 may be displayed on the display 34 of the mobile terminal. More specifically, in the embodiment of FIG. 6, in the step S31, the computer 12 causes the display 34 to display a message 51 requesting a stop permission as "Since it is determined that the mobile communication terminal exists outdoors, may a search of Wi-Fi be stopped?" as shown in FIG. 7, for example, after it is determined that a multipath occurs in the step S1. If and when the user selects a button 53 of "YES", the computer 12 determines "YES" in a step S33, and if and when the user selects a button 55 of "NO", the computer 12 determines "NO" in a step S33. If and when "YES" is determined in the step S33, that is, if and when the user permits a stop of search, the process by the computer 12 proceeds to the step S2 so as to stop the search of a radio repeater. On the other hand, if and when "NO" is determined in the step S33, that is, if and when the user does not permit a stop of search, the process by the computer 12 proceeds to the step S3 so as to perform the search of a radio repeater as described above.

According to the embodiment of FIG. 6, in a case where the mobile communication terminal 10 actually exits indoors or the user confirms that a radio repeater exists nearby, the search of a radio repeater can be stopped by a wish of the user, whereby wasteful consumption of a battery can be further suppressed.

FIG. 6 embodiment can be similarly applied to FIG. 5 embodiment, and in such a case, the step S31 and the step S33 of FIG. 6 may be inserted after the step S21 of FIG. 5.

Furthermore, in the step S2 in FIG. 3, FIG. 5 or FIG. 6, the search of a radio repeater is stopped, but not limited thereto, and a time interval that a search of a radio repeater is performed may be lengthened.

In addition, although the radio communication circuit 14 of the CDMA system is adopted in the embodiment of FIG. 1 in order to detect a multipath, a radio communication circuit of an LTE (Long Term Evolution) system, an OFDM (Orthogonal Frequency Division Multiplexing) system, etc. that can similarly perform processing of a multipath may be adopted.

Furthermore, in any of the above-described embodiments, it is shown that the radio communication circuit 14 and the short-distance radio communication circuit 40 are hardware chips separated from the computer 12; however, the circuit 14 and/or the circuit 40 may be incorporated within the computer 12.

An embodiment is a mobile communication terminal having a short-distance radio communication module operable to perform a short-distance radio communication by a first radio wave via a radio repeater, and a reception module operable to receive a second radio wave different from the first radio wave, comprising: a determination module operable to determine whether the mobile communication terminal (10) exists indoors or outdoors based on a state of the second radio wave that is received by the reception module; and a search module operable to perform a search of a radio repeater if and when the determination module determines that the mobile communication terminal exists indoors.

In this embodiment, in the mobile communication terminal (10: a reference numeral exemplifying a corresponding portion or module in the embodiment, and so forth) the short-distance radio communication module (40) of a Wi-Fi system, for example, performs a short-distance radio communication by the first radio wave for short-distance radio communication via the radio repeater (44) that may be called as an access point, for example. The reception module (14: 50) receives the second radio wave for mobile phone if and when the mobile communication terminal (10) is a mobile phone. The determination module (12, S1: S21) is constituted by a computer, for example, and determines whether the mobile communication terminal (10) exists indoors or outdoors based on a state of the second radio wave that is received by the reception module, e. g. whether the second radio wave can be received with a strength equal to or more than a predetermined strength, whether there is a multipath equal to or more than a predetermined degree, or the like. The search module (42) included in the short-distance radio communication circuit (40) of a Wi-Fi system, for example, is enabled by a search instruction from the computer (12) if and when the determination module (12, S1: S21) determines that the mobile communication terminal exists indoors, thereby to automatically search a radio repeater (access point).

According to this embodiment, since the search module automatically searches a radio repeater if and when the mobile communication terminal exists indoors, it is possible to omit a troublesome operation that the user turns the short-distance radio communication module on/off. Furthermore, in a case where the second radio wave is a radio wave for mobile phone, since the mobile phone always receives such a second radio wave even in a standby state, it is not necessary to utilize a special reception module for determining whether the mobile communication terminal exists indoors or outdoors, and therefore, it is possible to suppress the consumption of a battery. In addition, since it is necessary to use a separate reception module if and when the second radio wave is not a radio wave for mobile phone even if the mobile communication terminal is a mobile phone, that is, if and when the second radio wave is not a radio wave that the mobile communication terminal always receives, an advantage suppressing a consumption of a battery cannot be expected too much; however, since it is determined whether the mobile communication terminal exists indoors or outdoors based on a state of the radio wave (second radio wave), in comparison with a case where it is determined whether the mobile communication terminal exists indoors or outdoors by a camera image, it is possible to determine whether the mobile communication terminal exists indoors or outdoors even in a state that the mobile communication terminal is being put into a pocket or bag, and thus, it is possible to surely search a radio repeater, and accordingly, it is expectable an advantage that a troublesome operation by the user for searching a radio repeater can be omitted.

A further embodiment is the mobile communication terminal further comprising a stop module operable to stop the search by the search module if and when it is determined that mobile communication terminal exists outdoors.

In the further embodiment, the stop module (12, S2) stops the search by the search module (42) if and when the determination module determines that the mobile communication terminal exists outdoors.

According to the further embodiment, since if and when the mobile communication terminal exists outdoors, a search operation for radio repeater by the search module is forcedly stopped, there is no occasion that a radio repeater ought not to exist is searched, and therefore, it is possible to surely suppress the consumption of a battery due to a useless search.

A further embodiment is the mobile communication terminal further comprising a multipath detection module operable to detect a multipath of the second radio wave, wherein the determination module determines that the mobile communication terminal exists indoors if and when the multipath detection module detects a multipath qual to or more than a predetermined degree.

In the further embodiment, the multipath detection module (20) detects a multipath of the second radio wave. Here, the term "multipath" means a phenomenon that a radio wave that is transmitted traces a plurality of courses before the radio wave is received, and is generated by a reflected wave, a transmitted wave, a diffracted wave, etc. other than a direct wave that connects a shortest distance by a straight line. Then, the determination module (12, S1) determines that the mobile communication terminal exists indoors if and when the multipath detection module detects a multipath equal to or more than a predetermined degree.

According to the further embodiment, since a multipath that is usually apt to occur indoors is detected, it is possible to surely determine whether the mobile communication terminal exists indoors or outdoors. Furthermore, if and when the second radio wave is a radio wave that the mobile communication terminal usually receives, as described above, the consumption of a battery can be suppressed.

A further embodiment is the mobile communication terminal wherein the multipath detection module detects presence or absence of a multipath equal to or more than a predetermined degree based on a phase difference with a reference signal.

In the further embodiment, since the multipath detection module (20) detects the presence or absence of a multipath equal to or more than a predetermined degree based on a phase difference with the reference signal, generation of the multipath can be easily detected.

A further embodiment is the mobile communication terminal wherein the reception module comprises a GPS signal reception module operable to receive a GPS signal, and the determination module determines that the mobile communication terminal exists indoors if and when a reception strength of the GPS signal becomes equal to or less than a predetermined degree.

In the further embodiment, the GPS signal reception module (50) receives a GPS signal, and if and when the reception strength of the GPS signal becomes equal to or less than the predetermined degree, the determination module (12, S21) determines that the mobile communication terminal exists indoors.

According to the further embodiment, since it is determined whether the mobile communication terminal exists indoors or outdoors based on a state of the GPS signal, in comparison with a case where it is determined whether the mobile communication terminal exists indoors or outdoors is determined by a camera image, it is possible to surely determine whether the mobile communication terminal exists indoors or outdoors, an advantage is expected in that a troublesome operation by the user for searching a radio repeater can be omitted.

The other embodiment is a search method in a mobile communication terminal having a short-distance radio communication module operable to perform a short-distance radio communication by a first radio wave via a radio repeater, and a reception module operable to receive a second radio wave different from the first radio wave, and further a search module operable to search a radio repeater, comprising steps of: determining whether the mobile communication terminal exists indoors or outdoors based on a state of the second radio wave that is received by the reception module; and applying a search instruction to the search module if and when it is determined that the mobile communication terminal exists indoors.

According to the other embodiment, an advantage similar to the advantage by the above-described embodiment can be expected.

Although the present invention has been described and illustrated in detail, it is clearly understood that the same is by way of illustration and example only and is not to be taken by way of limitation, the spirit and scope of the present invention being limited only by the terms of the appended claims.

DESCRIPTION OF NUMERALS 10 denotes mobile phone,
12 denotes computer,
14 denotes radio communication circuit,
18 denotes rake reception module,
20 denotes phase detection module,
40 denotes short-distance radio communication circuit,
42 denotes search module,
44 denotes radio repeater, and
50 denotes GPS signal reception module.

The invention claimed is:

1. A mobile communication terminal comprising:
a short-distance radio communication circuit operable to perform a short-distance radio communication by a first radio wave via a radio repeater;
a reception circuit operable to receive a second radio wave different from the first radio wave;
a processor coupled to the short-distance radio communication circuit and the reception circuit, comprising
a multipath detection module operable to detect a multipath of the second radio wave;
a determination module operable to determine whether the mobile communication terminal exists indoors or outdoors based on a state of the second radio wave that is received by the reception circuit, wherein the determination module determines that the mobile communication terminal exists indoors if and when the multipath detection module detects a multipath equal to or more than a predetermined degree; and
a search module operable to search a radio repeater if and when the determination module determines that the mobile communication terminal exists indoors.

2. A mobile communication terminal according to claim 1 further comprising a stop module operable to stop the search by the search module if and when it is determined that the mobile communication terminal exists outdoors.

3. A mobile communication terminal according to claim 1, wherein the multipath detection module detects presence or absence of a multipath equal to or more than a predetermined degree based on a phase difference with a reference signal.

4. A method for operating a mobile communication terminal, the method comprising:
- performing a short-distance radio communication by a first radio wave via a radio repeater;
- receiving a second radio wave different from the first radio wave;
- detecting a multipath of the second radio wave;
- determining whether the mobile communication exists indoors or outdoors based on a state of the second radio wave, wherein the determination comprises determining that the mobile communication terminal exists indoors if and when the multipath is equal to or more than a predetermined degree; and
- searching a radio repeater if and when the mobile communication terminal exists indoors.

5. The method of claim 4, further comprising stopping the searching if and when it is determined that the mobile communication terminal exists outdoors.

6. The method of claim 4, wherein presence or absence of a multipath equal to or more than the predetermined degree is detected based on a phase difference with a reference signal.

* * * * *